United States Patent [19]

Carr et al.

[11] Patent Number: 4,480,304
[45] Date of Patent: Oct. 30, 1984

[54] METHOD AND MEANS FOR THE RETENTION OF LOCKS ACROSS SYSTEM, SUBSYSTEM, AND COMMUNICATION FAILURES IN A MULTIPROCESSING, MULTIPROGRAMMING, SHARED DATA ENVIRONMENT

[75] Inventors: Clarence A. Carr, San Jose; Robert L. Huddleston, Sunnyvale; Jimmy P. Strickland, Saratoga, all of Calif.

[73] Assignee: International Business Machines Corporation, Armonk, N.Y.

[21] Appl. No.: 194,506

[22] Filed: Oct. 6, 1980

[51] Int. Cl.³ .................... G06F 15/00; G06F 15/16
[52] U.S. Cl. .................................................. 364/200
[58] Field of Search ... 364/200 MS File, 900 MS File

[56] References Cited

U.S. PATENT DOCUMENTS 3,400,371  9/1968  Amdahl et al. ................. 364/200

OTHER PUBLICATIONS

OS/VS 2 MVS Overview IBM, May 1980.
IBM Virtual Machine Facility/370, Mar. 1979, IBM.
Information Management System/Virtual Storage, IBM, 1975.
IMS/VS Data Base Recovery Control Feature, IBM, 1979.
IMS/VS Version 1 Primer, IBM, 1978.
IBM World Trade Systems Centers, VSAM Primer & Reference, 1979.
Fault Tolerant Design of Local ESS Processors, by Toy, Proc. IEEE, vol. 66, No. 10, Oct. 1978, pp. 1126-1145.
The Tandem 16: Fault Tolerant Computing System, by James Katzman, ©1977, Tandem Computers.

*Primary Examiner*—Felix D. Gruber
*Assistant Examiner*—John G. Mills
*Attorney, Agent, or Firm*—Shelley M. Beckstrand

[57] ABSTRACT

Method and means for operating a computing system for controlling access to and maintaining the integrity of data resources shared by multiple applications executing on a plurality of central electronic complexes (CEC's) while minimizing communication of sharing control parameters between different electronic complexes. Each complex includes a resource lock manager (IRLM) which maintains the hold and wait locks for applications executing under one or more information management subsystems on the complex and selected wait locks for the other complex. Selective communication of lock request information is controlled by hash tables maintained in synchronization in each IRLM, which denote the interest of each complex in each hash class, or congruence class, of data resources. A first complex already having exclusive use of a congruence class grants locks on data resources which map into the congruence class without communication of the request to the other complex. When such communication is required, and the other complex determines that an inconsistent hold lock already exists for the data resource of the request, the lock request is waited in both IRLM's. When the inconsistant hold lock is subsequently released, the wait lock is deleted from the IRLM of the other complex, and the first complex grants the requested lock.

Each IRLM also includes an identified subsystem list (ISL), which is maintained in synchronization and used along with the hash tables and hold/wait locks to retain locks across CEC, subsystem, and communication link failures and to enhance recovery thereafter.

8 Claims, 2 Drawing Figures

METHOD AND MEANS FOR THE RETENTION OF LOCKS ACROSS SYSTEM, SUBSYSTEM, AND COMMUNICATION FAILURES IN A MULTIPROCESSING, MULTIPROGRAMMING, SHARED DATA ENVIRONMENT

TECHNICAL FIELD

This invention relates to new and useful improvements in the methods of operating general purpose digital computing systems on one or more programs at the same time. More specifically, the present invention relates to dynamically controlling access to and maintaining the integrity of resources shared by different programs executing on one or more central electronic complexes which minimizing communication of sharing control parameters between different central electronic complexes.

BACKGROUND ART

In large data base systems where many work units or subtasks have a need to share access to the same records, there is a need to manage concurrent access to maintain integrity of the data.

One prior art approach to data sharing is illustrated by the concurrent accessing of a VSAM (Virtual Sequential Access Method) data set by two or more subtasks within a single partition, by two or more job steps (partitions), and by any number of users (cross-system sharing). As is explained in VSAM Primer and Reference, IBM Publication G320-5774-01 (1979), at pages 95–97, various options are available for opening a data set for either read or write.

In VSAM cross-partition/region sharing the option is defined by the SHARE OPTIONS parameter of the DEFINE command when the VSAM data set is defined. By a first option, a data set may be opened by only one user for output processing (to update or add records), or by multiple users for read operations only. By this option, full read and write integrity is provided. In a second option, a data set can be opened by one user for output processing and by multiple users for read-only processing. In this option, write integrity is provided, but read integrity is not, as users can read a record that is in the process of being updated. In a third option, a data set can be opened by any number of users for both read and write operations, and no integrity (read or write) is provided by VSAM.

In VSAM cross-systems sharing, by a first option, a data set can be opened by any number of users for both read and write operation, and no integrity is provided by VSAM. In a second option, a data set can be opened by any number of users for both read and write operations—however, VSAM provides a new buffer for each direct processing request, and RESERVE and RELEASE macros must be issued by users to maintain data set integrity.

In each of the above options, except the first, the user of VSAM must maintain data set integrity, issuing the required ENQ/DEQ or RESERVE/RELEASE macros.

In the prior art IBM IMS/VS product, the issuance of such macros is a function of the Program Isolation facility. (See IMS/VS Version 1 Primer, Program Number 5740-XX2, Release 1.5, IBM Publication SH 20-1945-0, pages 3.12–3.14.) However, this facility does not provide for multiple concurrent access to common data by users executing on different central electronic complexes (CEC's), resulting in a significant impediment to the efficient use of data bases by large organizations.

One prior art approach to enabling multiple concurrent access to common data is S. B. Behman, et al, U.S. patent application Ser. No. 965,810, filed Dec. 4, 1978 (SA976036) for External Enqueue Facility for Access to Sharable Data FAcilities. Behman, et al, is a concurrency notification facility. External Enqueue Facility (EEF) 5 maintains for each member CPU and congruence class an interest bit. When set, the interest bit indicates that the CPU holds or is waiting for a lock on a data resource of the corresponding concurrence class. Each CPU includes an Internal Enqueue Facility (IEF), which maintains for each congruence class a lock bit. Request for access to data resource is granted by the CPU if the corresponding lock bit in the IEF is set; but if not set, the request must be communicated first to the EEF and thence to other CPU's showing in the EEF an interest in the congruence class of the request. The Behman system is, in effect, a concurrency notifier, there being no structure described for controlling concurrent access. Furthermore, the EEF structure is implemented either in a separate hardware device or in one of the CPU's. A failure in the EEF effectively prevents communication between the CPU's and processing of any data resource access request by any of the CPU's: there being no provision in each CPU for maintaining locks held by failed CPU's or the EEF for subsequent recovery.

SUMMARY OF THE INVENTION

It is, therefore, an object of the invention to provide an improved method and structure for controlling concurrent access to data resources by multiple users on the same and/or different central electronic complexes (CEC's).

It is a further object of the invention to provide a locking structure which enables recovery from subsystem, communication, and lock manager failures.

It is a further object of the invention to provide an improved communication protocol for optimizing the communication of lock data between CEC's concurrently accessing data resources.

It is a further object of the invention to provide a method for operating a general purpose computing system to control the allocation of data, communication, and computing resources among plural users in a multiprogramming and multiprocessor environment.

It is a further object of the invention to provide an improved method and means for inhibiting access to shared data resources that may be inconsistent due to failure of a CEC, operating system, subsystem, or communication link.

According to this invention, method and means are provided for controlling access to shared data resources in a multiprocessing, multiprogramming general purpose computing environment to inhibit access to data resources that may be inconsistent due to failures of a communication link, operating system, subsystem, or lock control structure. Maintained within each of a plurality of central electronic complexes is a lock control structure, the lock control structure including a global hash table containing (for each complex) an indication of interest in data resources in a plurality of congruence classes, the lock control structure also including a subsystem list identifying each subsystem associated with each lock control structure. Responsive to failure of a first subsystem, all locks previously granted to the first subsystem are retained within the lock control structure until released by restart or recovery of the first subsystem. Access by the other subsystems is enabled only to specific data resources not locked by the first subsystem. Responsive to failure of a first operating system on a first complex, the global hash table entries for the first complex are retained in the lock control structure of the other complexes. The granting of new locks for data resources in those congruence classes in which the first complex had an interest is inhibited until the global hash table entries for the first complex have been cleared by restart/recovery of all subsystems associated with the lock control structure of the first complex. Responsive to failure of a communication link interconnecting two complexes, each complex is operated to inhibit the granting of locks for any data resource of a congruence class in which the complex did not have a prior interest together with no prior interest by the other complex.

DISCLOSURE OF THE INVENTION

The invention provides a computer structure and method for operating a general purpose computer for sharing data resources while maintaining integrity and recovery from failures, all with optimum utilization of such computing resources as storage, communication, and computing facilities.

In R. L. Obermarck, et al, "Method and Means for the Sharing of Data Resources in a Multiprocessing, Multiprogramming Environment", U.S. Pat. No. 4,399,504 there is claimed the method and apparatus for accessing shared data using a global hash table structure. Herein is claimed the method and apparatus for retention of locks across failures and to facilitate recovery and inhibit access to data which may be inconsistent due to the failure. This specification, for completeness, sets forth both of the above closely related inventions.

The invention is substantially embodied in a resource lock manager module, structured to operate a general purpose computing system according to the method of the invention. The resource lock manager functions include the following procedures:

|  | TABLE |
|---|---|
| LOCK | 4 |
| UNLOCK | 8 |
| INQUIRY | 6 |
| INQRESP | 7 |
| GHTUPD | 10 |
| GRANT | 9 |
| PTB | 5 |
| IDENT | 11 |
| QUIT | 12 |
| VERIFY | 13 |
| PURGE | 14 |
| FAIL | 15 |
| RECONNECT | 16 |

These procedures will be described in connection with the pseudocode representation of the invention in Tables 4 through 16, below. The above procedures use the following data objects:

| MCB | Master Control Block |
|---|---|
| RHT | Resource Hash Table |
| GHT | Global Hash Table |
| RGHT | Retained Locks Global Hash Table |
| RHB | Resource Header Block |
| RLB | Resource Lock Block |
| WHB | Work Unit Block |
| SIDB | Subsystem Identify Block |
| ISL | Identified Subsystem List |
| RLPL | Resouce Lock Request Parameter List |

These data objects will be described in connection with FIG. 2, which sets forth a typical configuration of an IRLM 61, 62 and is useful in explaining the relationships between these data structures for various data sharing and failure modes. The RHB, RLB, WHB, and SIDB chains are dynamically structured within each central electronic complex (CEC), as will be more fully described.

Figure 1:
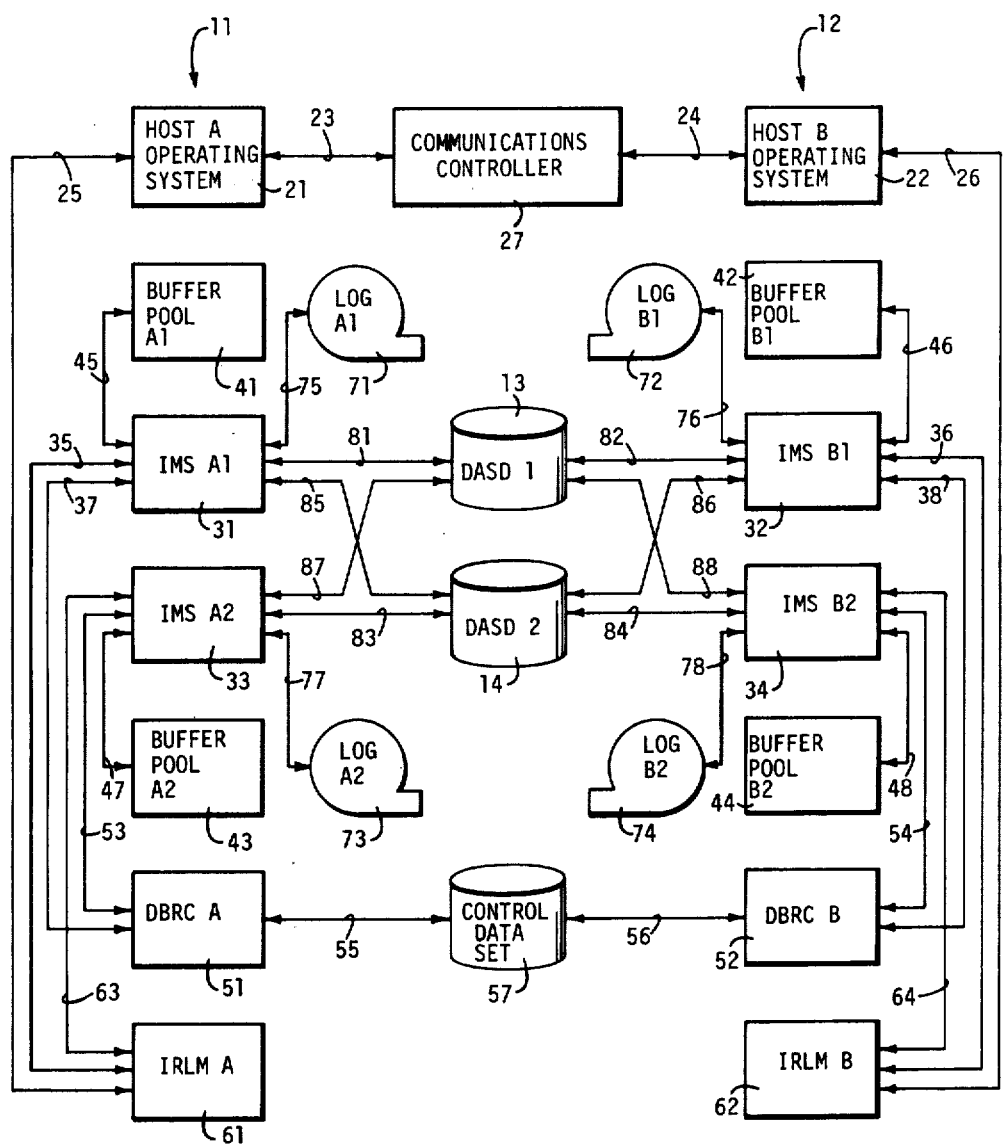
FIG. 1 is a block diagrammatic representation of a typical computing system configuration for operation according to the invention.

FIG. 1 is a representation of a typical system with plural central electronic complexes (CEC's) 11, 12 sharing access to data stored in Direct Access Storage Devices (DASD) 13 and 14. Within each complex 11, 12 is a real or virtual address space, including a number of data storage and program areas. Those pertinent to the operation of the system according to the method of the invention are illustrated in FIG. 1 and include a host operating system 21, 22; one or more information management systems (IMS) 31-34; a buffer pool 41-44 for each IMS; a data base recovery control (DBRC) system 51, 52; and an IMS resource lock manager (IRLM) 61, 62.

Each IMS 31-34 is adapted for communication with one of transaction log tapes 71-74. Complexes 11, 12 are interconnected by communications controller 27 (or, alternatively, by a channel-to-channel adapter) and are loosely coupled through shared DASD's 13, 14 and control data set 57.

Each central electronic complex 11, 12 comprises a general purpose central processing unit—together with main storage and virtual storage devices, and the necessary channels and peripheral equipment, such as the IBM System/360 or IBM System/370, the architecture of which is described in U.S. Pat. No. 3,400,371 by G. M. Amdahl, et al, entitled, "Data Processing System", and in IBM System/370 Principles of Operation, IBM Publication GA22-7000-6.

Each complex 11, 12 operates under control of an operating system 21, 22, such as the IBM System/360 and 370 Operating Systems, IBM Publications, GC 28-0661, and GC 20-1800. IMS's 31-34 execute under control of their respective operating systems 21, 22—and utilize these operating system facilities for interfacing communications controller 27, which may be, for example, an IBM 3705 Communications Controller. This invention provides enhancements to the IBM IMS/VS, program product number 5740-XX2 as described in IBM Publication SH20-9145-0, to provide a new and useful method for sharing of data on DASD devices 13, 14 between IMS's 31-34 executing on the same or different CEC's 11, 12.

Data base recovery control (DBRC) modules 51, 52 on each CEC share a control data set 57, which may reside on a direct access storage device, such as an IBM 3350. An example of a DBRC is the IBM IMS/VS Data Base Recovery Control Feature, program number 5740-XX2, described in IBM Publication SH35-0027-1, as modified to operate a computing system according to the invention, as will be subsequently described.

Referring further to FIG. 1, the operation of a typical computing system, including two CEC's 11, 12, will be described. Assuming that no failure conditions exist, one or more application programs (not shown) execute in a multiprogramming environment on each CEC, each one under control of one of IMS's 31–34.

When an application work unit executing under IMS 31, for example, requires access to a data resource residing, for example, on DASD 13, IMS 31 will generate a lock request for communication to IRLM 61, as is represented by control path 35. A lock request includes the information in Table 1.

TABLE 1

| Lock Request Format | | | | |
|---|---|---|---|---|
| Key | Hash | State | SIDB Addr | Option |

The Key field gives the name of the data base record, or resource, to which access is required. The Hash field gives the hash class, or congruence class of the resource—which is determined by any one of a number of hashing techniques available in the prior art, such as described in Behman, et al, U.S. patent application Ser. No. 965,810, filed Dec. 4, 1978. The State field specifies one of eight lock states and is used to determine resultant state and compatibility when a data resource is being locked by more than one work unit. In order to permit a data resource to be locked more than once by a given work unit, when a work unit locks a resource for a second time, specifying a different state than for the first lock request, the state in which the lock is finally held should be one that carries the privileges of the second state without losing those conferred by the first. This permits a nonhierarchical privilege order, where each higher state does not necessarily include all the privileges of the preceding one.

The state value from the lock request State field, and that of the prior lock request by the same work unit for the same resource, are used to enter the following resultant state matrix to obtain a third state. The lock request is then processed in IRLM 61 as a request for the third state.

TABLE 2

| | Resultant State Matrix (Third State) | | | | | | | |
|---|---|---|---|---|---|---|---|---|
| | | | | Requested | | | | |
| Held | 1 | 2 | 3 | 4 | 5 | 6 | 7 | 8 |
| 1 | 1 | 2 | 3 | 4 | 5 | 6 | 7 | 8 |
| 2 | 2 | 2 | 3 | 4 | 5 | 6 | 7 | 8 |
| 3 | 3 | 3 | 3 | 6 | 5 | 6 | 7 | 8 |
| 4 | 4 | 4 | 6 | 4 | 5 | 6 | 7 | 8 |
| 5 | 5 | 5 | 3 | 5 | 5 | 6 | 7 | 8 |
| 6 | 6 | 6 | 6 | 6 | 6 | 6 | 7 | 8 |
| 7 | 7 | 7 | 7 | 7 | 7 | 7 | 7 | 8 |
| 8 | 8 | 8 | 8 | 8 | 8 | 8 | 8 | 8 |

When more than one work unit is accessing the same resource, the following matrix is used to determine if the lock request states are compatible (x indicates incompatibility).

TABLE 3

| | Compatibility Matrix | | | | | | | |
|---|---|---|---|---|---|---|---|---|
| | | | | Requested | | | | |
| Held | 1 | 2 | 3 | 4 | 5 | 6 | 7 | 8 |
| 1 | | | | | | | | x |
| 2 | | | | | | | x | x |
| 3 | | | x | x | x | x | x | x |
| 4 | | x | | | x | x | x | x |
| 5 | | x | | x | x | x | x | x |
| 6 | | x | x | x | x | x | x | x |
| 7 | x | x | x | x | x | x | x | x |
| 8 | x | x | x | x | x | x | x | x |

Returning to Table 1, Lock Request, the SIDB Addr field specifies the location in memory of the system identifier block and is used to access the work header block (WHB) chain in IRLM 61, as will be described more fully hereafter. The Option field specifies whether the lock request is conditional or unconditional. If the "conditional" option is specified and the IRLM determines that the resource was previously locked in an incompatible state (as determined by Table 3), the work unit will be notified that the lock cannot be granted. However, if the "unconditional" option is specified, the lock requested will be waited, and the work unit only notified when the prior lock is released and the waited request granted.

In processing the lock request, IRLM 61 may communicate with IRLM 62 along the control/data path 25, 21, 22, 23, 27, 24, 26. The conditions under which such communication is necessary or avoided will be more fully described hereafter, as will be the structure and steps for granting the locks.

Once the lock is granted by IRLM 61 to IMS 31, it accesses the desired data in DASD 13 over line 81, and reads the data into its buffer pool 41. At an appropriate commit prior in the processing of the data by the application work unit, the data is written back out to DASD 13 and IRLM 61 notified to release the locks.

In a similar manner, IMS's 31–34 cooperate with IRLM's 61, 62 to access data on DASD's 13, 14 and operate on the data stored in buffer pools 41–44.

Each IMS 31–34 maintains a log of all transactions on log tapes 71–74, respectively, for recovery in the event of a failure. Data base recovery control facilities 51, 52 share access to control data set 57, and cooperate with IMS's 31–34 to control the recovery of a data base in the event of a system or other failure, as will be more fully described.

Figure 2:
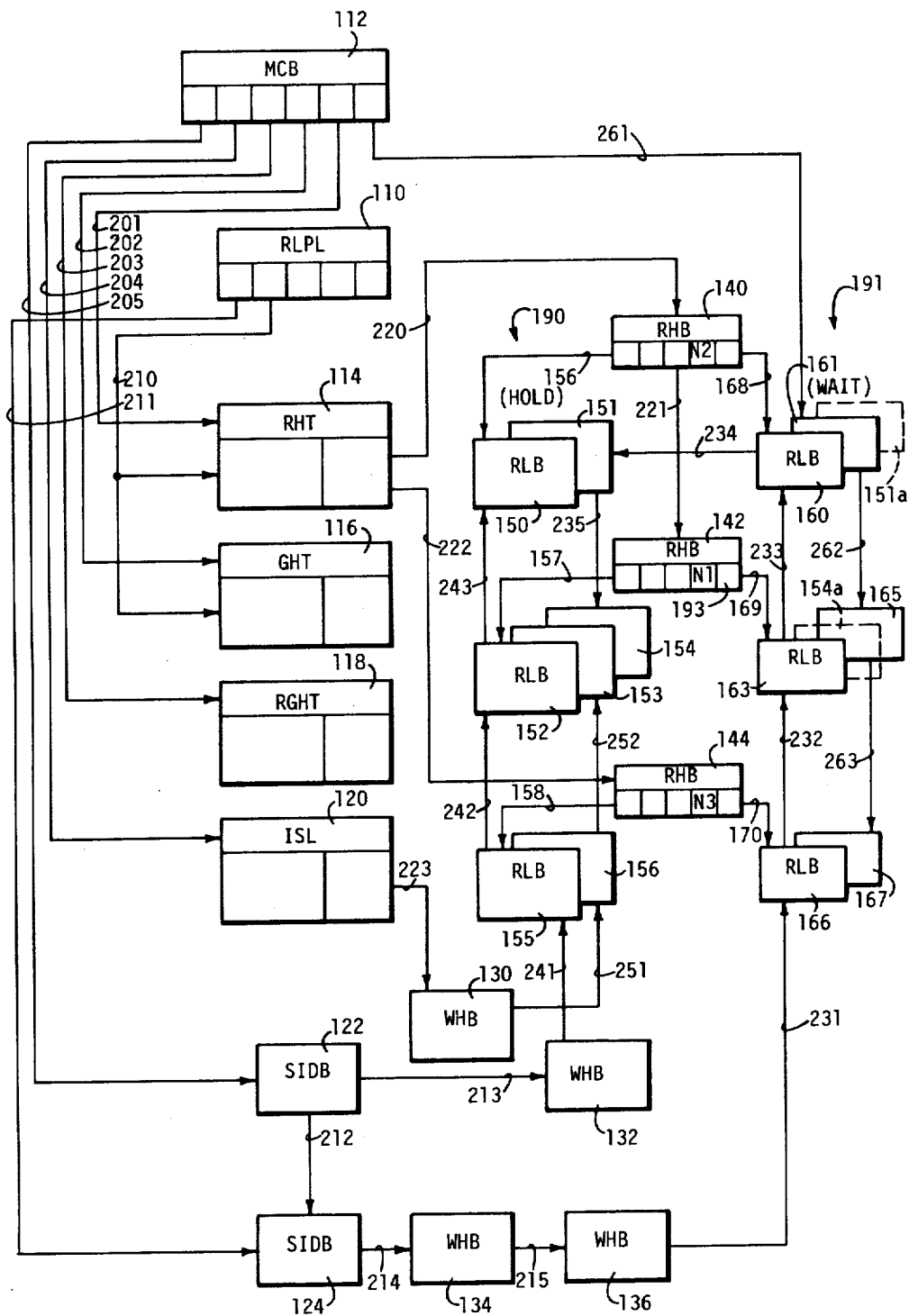
FIG. 2 is a block diagrammatic view of resource lock manager of FIG. 1.

Referring now to FIG. 2, a description of IRLM 61 will be given, defining the primary data objects used in operating the computing system according to the method of the invention.

Resource Lock Request Parameter List (RLPL) 110 is used by IMS 31, 33 to submit a request to IRLM 61. It includes, in accordance with the preferred embodiment, a 32-bit resource hash value 210, a 32-byte resource name, a 4-byte SIDB address 211, an 8-byte work unit ID, a 1-byte requested lock state, and an option indicator (conditional or unconditional).

Master Control Block (MCB) 112 provides address pointers 201–205, 261 to the following structures and chains: RHT 114, GHT 116, RGHT 118, ISL 120, SIDB 122 (the first in the SIDB 122, 124 chain 212), and RLB 161 (the first in the chain 262–263 of wait RLB's 161, 165, 167 corresponding to requests from the other IRLM 62).

Resource Hash Table (RHT) 114 contains herein 512 entries. Each entry is 8 bytes long and includes a 32-bit mask (4 bytes) and a 4-byte pointer (such as 220, 222) to the first RHB (140 and 144, respectively) in the corresponding RHT hash class (also referred to as a hash group or a congruence class). Each bit in the RHT bit mask corresponds to one of the 16,384 entries in the GHT, infra, and, when set, serves as the private use indicator discussed more fully hereafter.

Global Hash Table (GHT) 116 contains herein 16,384 entries, each entry being one byte long, with each bit thereof assigned to correspond to one IRLM Identifier (IRLMID). In the best mode description of the invention provided herein, only two bits are utilized, however, corresponding to IRLMID=1 for IRLM 61, and IRLMID=2 for IRLM 62. A bit on in a GHT 116 entry means that the IRLM 61, 62 with the corresponding IRLMID is holding and/or waiting for a lock on at least one resource that hashes into that GHT 116 entry.

Retained Locks Global Hash Table (RGHT) 118 contains herein 16,384 entries. As with GHT 116, each entry in RGHT 118 is one byte long, with two bits (0 and 1) utilized in this embodiment and bit 0 corresponding to IRLMID=1 for IRLM 61, and bit 1 corresponding to IRLMID=2 for IRLM 62. A bit on in a RGHT 118 entry means that the IRLM 61, 62 with the corresponding IRLMID was holding and/or waiting for a lock on at least one resource that hashed into the GHT entry corresponding to this RGHT entry at the time that IRLM failed (abnormally terminated). No new lock requests may be granted against locks that hash into a RGHT entry that has any bit on.

Identified Subsystem List (ISL) 120 provides a list of entries defined by the IDENT procedure. Each IRLM 61, 62 contains a copy of ISL 120, which shows all IMS's 31-34 associated with both IRLM's. An entry contains:

(1) an 8-byte IMS 31-34 name
(2) the IRLMID of the IRLM 61, 62 to which the IMS 31-34 is or was last connected.
(3) a one byte "retained by QUIT RETAIN" mask, with each bit assigned to an IRLM in the same manner as in GHT entry, and a bit on in this mask meaning the corresponding IRLM 61, 62 has locks retained for this IMS 31-34 due to an explicit QUIT RETAIN request.
(4) a one byte "retained due to IRLM or communications failure" mask (ISLFMSK), with each bit assigned to an IRLM as in a GHT entry, and a bit on in this mask meaning the corresponding IRLM was holding locks for this IMS and then an IRLM, system or communications failure occurred.
(5) a four-byte pointer 223 to a dummy WHB 130 from which retained lock RLB's 156, 153 are chained 251, 252. This exists only for the QUIT RETAIN case and then only in the ISL 120 of the IRLM 61, 62 to which the IMS 34-34 was connected when the QUIT request was issued, as will be more fully described hereafter.

An IMS Subsystem Identify Block (SIDB) 122, 124 is built by IRLM 61 or 62 when an IMS subsystem 31-34 is identified to the IRLM. The WHB's for this IMS's work units are chained from this block. Herein, by way of example, SIDB 122 is chained 213 to WHB 132 and SIDB 124 is chained 214, 215 to WHB's 134, 136.

Each Work Unit Block (WHB) 132, 134, 136 represents an IMS work unit that holds and/or waits for locks, and contains a chain of all hold and wait RLB's associated with the WHB. By way of example, wait RLB's 166, 163, 160 and hold RLB's 151, 154 are chained 231, 232, 233, 234, 235 to WHB 136; and hold RLB's 155, 152, 150 are chained 214, 242, 243 to WHB 132, respectively.

Resource Header Blocks 140, 142, 144 are created for each unique resource name for which a lock is requested and/or held, with all RHB's that hash into one of the plurality of hash groups corresponding to one RHT entry forming an RHB chain. Each RHB contains:

(1) the resource hash value (32 bits)
(2) the resource name (32 bits)
(3) an IRLM interest mask, which is used in the same manner as a GHT entry. A bit on in this mask means the corresponding IRLM is currently holding a lock on this resource.
(4) an RHB chain word, used to maintain a chain of RHB's that hash into the same RHT entry. By way of example, RHB 140 is chained 221 to RHB 142 and anchored 220 to an entry in RHT 114. RHB 144 is anchored 222 to a different entry in RHT 114.
(5) a wait RLB chain word, and a hold RLB chain word, chaining the RHB to chains of lock holder RLB's and lock waiter RLB's. By way of example, RHB 140 is chained 156 to lock holder RLB's 150-151 and chained 168 to lock waiter RLB's 160-161; RHB 142 is chained 157 to lock holder RLB's 152-154 and chained 169 to lock waiter RLB's 163, 165; and RHB 144 is chained 158 to lock holder RLB's 155, 156 and chained 170 to lock waiter RLB's 166, 167.

Each Resource Lock Block (RLB) represents a lock holder or a request waiting to acquire a lock. Each RLB includes, inter alia, the lock state.

The data structure configuration of FIG. 2 represents a typical configuration for one IRLM, say 61, and a similar structure will exist for the other IRLM 62. Some data objects are maintained in sync (that is, substantially identical), allowing for communication delays during normal processing—and these include the GHT, RGHT, and ISL.

The Resource Lock Manager IRLM 61, 62 provides lock services used by the IMS 31-34 Data Sharing Function. The lock services include the retention of locks across IMS sybsystem, communications link, and operating system failures. The retained locks inhibit access to data base 13, 14 information that may be inconsistent due to the failure.

The integrity of data base 13, 14 information within the IMS/VS Shared Data environment is the combined responsibility of the DL/I Data Management Function (a component of IMS 31-34), Data Base Recovery Control (DBRC) 51, 52 and the IRLM 61, 62.

DL/I (a component of IMS) performs the access to the data bases 13, 14 and maintains log data sets 71-74 that are used to recover/repair the data bases when various failures occur.

DBRC 51, 52 maintains data base data set usage information. This information shows which IMS/VS subsystems are currently using each data set. DL/I 31-34 invokes DBRC 51, 52 services when allocating and deallocating the data sets on DASD 13, 14. During data set allocation, DBRC 51, 52 returns to DL/I 31-34 a list containing the names of the IMS/VS 31-34 subsystems that are currently using the data set. DL/I 34-34 invokes an IRLM 61-62 service (VERIFY), Table 13, passing the IMS 31-34 name list. The IRLM returns to DL/I an indication of whether each IMS 31-34 in the list is or is not currently using the IRLM 61-62 Services. Using the IRLM 61, 62 services includes the case when the IMS was using the IRLM but failed, and the IRLM is retaining its locks. If any of the IMS subsystems 31-34 are not known by IRLM 61-62, then DL/I 31-34 will not allocate the data set. This is necessary because unless IRLM 61-62 is holding locks for each of the IMS subsystems 31-34, continued use of the data set will expose the integrity of the data.

As previously noted, each IRLM 61, 62 maintains in an IMS/VS Identified Subsystem List (ISL), a list of all IMS subsystems 31-34 currently connected to either of the two IRLM's in the two-system environment. ISL 120 is used to process a VERIFY (Table 13) request to determine if the IMS subsystem names in the input list are in ISL 120. Each IRLM 61, 62 holds the locks for the set of IMS 31-34 subsystems connected to it. Both IRLM's 61, 62 maintain a copy of the Global Hash Table (GHT) 116 and the Retained Locks Global Hash Table (RGHT) 118.

The ISL 120, GHT 116 and RGHT 118 provide the information that protects the locks across intersystem communications, subsystem, and/or system failures.

With respect to the retention of locks across outage of an IMS subsystem 31-34, the IRLM 61-62 retains all locks held by a failed IMS subsystem. This permits continued use of data bases that were shared with the failed subsystem. The locks inhibit access to the specific data items that are inconsistent due to the failure, but permit access to all other parts of the data bases. When either restart or recovery processing is performed for the failed IMS, DL/1 requests IRLM 61, 62 to release the retained locks, thus permitting full access to the data bases.

Failure of one of the two operating systems 21, 22 or IRLM's 61, 62 causes the IRLM 62, 61 in the other system to retain (in RGHT 118) the GHT 116 information for the IRLM in the failed system. The GHT 116 shows all hash classes in which the failed IRLM 62, 61 held resource locks. The remaining IRLM 61, 62 will not grant new lock requests for resources in these hash classes until the failed IRLM's interest bits have been removed from the corresponding GHT 116 (RGHT 118) entries. These bits will be cleared when restart or recovery has been performed for all of the IMS subsystems that were associated with the failed IRLM. ISL 120 shows this list of subsystems. The restart/recovery may be performed on the system that continues to operate after the failure or on the original system after it has been restarted.

GHT 116 permits continued processing during an outage of intersystem communications capability. A GHT 116 entry value of 10 means that IRLM 61 holds locks on resources that map into the entry and IRLM 62 does not hold locks on any such resources. A value of 01 means IRLM 62 holds locks and IRLM 61 does not hold locks on resources that map into the entry. During the communications outage, IRLM 61 grants locks for any resources that map into GHT entries of value 10, and IRLM 62 grants locks for resources that map into entries of value 0.1. Neither IRLM grants any new locks for resources that map into GHT entries that contain other values.

When communications are re-established, both IRLM's exchange information to form a composite GHT and ISL, and then both IRLM's resume normal lock function, using the new GHT.

Referring now to FIG. 1, the operation of a computing system, including two central electronic complexes 11, 12, according to the method of the invention, will be described.

Operation of the computing system to retain locks across system (IMS 31-34), communication (controller 27 and link 21-24) and IRLM 61, 62 failures is based primarily upon the structure including DBRC 51, 52, with its control data set 57 and the ISL 120/GHT 116/RGHT 118 structures of IRLM's 61, 62.

Data Base Recovery Control (DBRC) modules 51, 52 coordinates IMS systems IMS 31-34 to merge logs 71-74 after a failure to reconstitute data bases stored in DASD 13, 14. DBRC 51, 52 also operate to inform IMS's 31-34 which IMS's are accessing data. To do so, DBRC 51, 52 maintain status of use of the data bases by each IMS, keeping a record of which IMS systems have access to each data base and its state (update, read only).

An example of a DBRC 51, 52 module is the IMS/VS Data Base Recovery Control Feature described in IBM Publication SH35-0027-1, Program Number 5740-XX2, Second Edition (March 1979), as subsequently modified to operate according to the method described hereafter—which modifications, however, do not form a part of the present invention. Rather, this lock retention invention relates to those method steps executed under control if IRLM 61, 62 and their interconnecting components. However, to fully appreciate the invention, it is necessary to consider the invironment in which IRLM 61, 62 operates, including those functions performed by DBRC 51, 52 and IMS 31-34.

As an application program or work unit accesses a data base record on DASD 13, 14 for update, it is placed in one of buffer pools 41-44. After the record has been changed or added, it is written back out to DASD 13, 14, and copies in other buffer pools 41-44 corrected to make the change, and a record of the change recorded on one of log devices 71-74, together with a sequence number. If, thereafter, a data base fails, it may be repaired from information in logs 71-74. The problem is merging changes to the data base (13, 14) from different logs 71-74 in the correct sequence. DBRC 51, 52 and IRLM 61, 62 are used according to the following protocol to control that repair.

Assume that an application under IMS 31 requires access to a data resource on DASD 13. Data sharing-/locking coordination is as follows:

(1) IMS 31 goes to DBRC 51 to ascertain if the data base containing the required record is available in a compatible state.
(2) If compatible, DBRC 51 advises IMS 31, and
(3) DBRC 51 advises IMS 31 which other subsystems (i.e., IMS 34) are using the data base.
(4) IMS 31 goes to IRLM 61 and asks if IMS 34 is known to IRLM 61. (If not, IMS 31 cannot rely on IRLM 61 to ensure that the data base is protected. This could happen if CEC 12 had failed and IRLM 61 had not received communication from IRLM 62 regarding the activity of IMS 34.) IRLM 61 return codes to IMS 31 are:
 0 IMS 34 is active on IRLM 61 or IRLM 62.
 4 IMS 34 has terminated, but its locks are retained in IRLM 61 and/or IRLM 62.
 8 IMS 34 is unknown to IRLM 61.
(5) If IMS 31 receives a return code of 8, it is not permitted to access the data base.

(6) If IMS 31 receives a return code of 4, IMS 31 can access the data base, but not updated data (i.e., data resources or data records) within the data base previously locked by IMS 34. If a collision occurs with a lock held by IMS 34, IMS 31 receives a "lock request denied due to lock retained for a failed IMS" status on such request.

(7) If IMS 31 receives a return code of 0, IMS 31 is permitted to access the data base. If a collision occurs with a lock held by IMS 34, IMS 31 will wait for the lock to be released by IMS 34. (Any changes in the locks by one IMS are broadcast by IRLM 61, 62 to the other. This is the normal situation.)

The procedure to be followed during recovery from a failure will next be described. Assume that CEC 11 fails, causing operating system 21, IMS's 31, 33, DBRC 51, and IRLM 61 all to fail. Thereafter, the computer operator restarts operating system 21, IMS 31, DBRC 51, and IRLM 61. IRLM 61 re-establishes communications with IRLM 62. The GHT 116, RGHT 118, and ISL 120 for IRLM 61 will be re-established from IRLM 62. If IMS 31 desires to access data base 13, it will go to DBRC 51 for authorization. DBRC 51, from information logged on control data set 57, informs IMS 31 that IMS 33 has access to data base 13. IMS 31 then goes to IRLM 61, which returns with return code 4—indicating that IMS 33 has failed but its locks are retained. Consequently, IMS 31 restores data base 13 from data on its log 71 and continues to use data base 13. Subsequently, when IMS 33 restarts and desires to access data base 13, it goes first to DBRC 51. DBRC returns with an indication that IMS 31 is using data base 13, and that IMS 33 has backout responsibility. Consequently, IMS 33 will, from log 73 data, restore data base 13—advising DBRC 51 when it is completed. IMS 33 and 31 can now access data base 13.

In this environment, an application is considered to have backout responsibility if it has written back to DASD an updated record but has not yet released the locks, and a failure occurs which prevents completion of the work unit. A work unit may, typically, access many records—all of which must be updated to be consistent before the locks are released. Thus, herein a commit point is defined as that point in processing an application when all changed records have been written out to DASD and the locks released.

For example, assume a work unit on IMS 31 includes accesses to data base 13 records DBS 1, DBS 2, DBS 3, and then commit, in that order. Assume that IMS 33 fails after updated DBS 2 has been written to DASD 13. If IMS 31 already holds the lock on DBS 3, it can access DBS 3 and proceed to commit. If it doesn't, then IMS 31 must back out its updates to DBS 1 and DBS 2. On the other hand, if IMS 33 fails after DBS 3 has been accessed, then IMS 31 can proceed to commit.

The procedures executed by the IRLM in practicing the method of the invention will next be described in connection with the pseudocode representation of Tables 4 through 16. As will be apparent to those skilled in the art, the pseudocode representation, together with the accompanying description, enables those skilled in the art to generate, without undue experimentation, the necessary machine-executable instructions to operate a general purpose computing system according to the method of the invention. On the other hand, to describe the invention with source and/or object code of a working implementation would tend to obscure the inventive subject matter in extraneous detail, resulting in a lack of clarity and conciseness required for an understanding of the invention.

In the pseudocode tables, "$\tau =$" signifies "not equal", and comments are bracketed between "/=" and "=/". References to IMS/VS are to one of IMS 31–34.

TABLE 4

| LOCK | |
|---|---|
| LOCK: PROCEDURE. | 1600 |
| Build an RLB for the new lock request. | 1610 |
| | 1620 |
| Using RLPL hash and resource name values search | 1630 |
| the RHT—RHB structure to determine if an RHB for | 1640 |
| the requested resource exists. | 1650 |
| | 1660 |
| /= _____ =/ | 1670 |
| /= =/ | 1680 |
| /= To grant a global lock request the following changes =/ | 1690 |
| /= are made to the IRLM control block structure. =/ | 1700 |
| /= 1. The interest bit of the IRLM granting the lock is =/ | 1720 |
| /= turned on (if not already on) in the GHT entry =/ | 1730 |
| /= corresponding to the requested hash value. =/ | 1740 |
| /= 2. If this IRLM has private use of the GHT entry =/ | 1760 |
| /= the corresponding RHT-mask private use bit is =/ | 1770 |
| /= turned on. =/ | 1780 |
| /= =/ | 1790 |
| /= 3. An RHB is built (if it doesn't already exist) =/ | 1800 |
| /= containing the requested hash and resource name. =/ | 1810 |
| /= The RHB interest mask shows which IRLMs are =/ | 1820 |
| /= holding locks on the resource. =/ | 1830 |
| /= =/ | 1840 |
| /= 4. An WHB is built (if it doesn't already exist) =/ | 1850 |
| /= containing the lock holder's work unit identifier. =/ | 1860 |
| /= The WHB is connected to the requesting IMS/VS's =/ | 1870 |
| /= SIDB. =/ | 1880 |
| /= =/ | 1890 |
| /= 5. An RLB is built to represent the held lock. =/ | 1900 |
| /= The RLB contains the held state of the lock. =/ | 1910 |
| /= The RLB is connected to the RHB and WHB. =/ | 1920 |
| /= =/ | 1930 |
| /= _____ =/ | 1940 |
| | 1950 |

TABLE 4-continued
LOCK

| | |
|---|---|
| Determine if a WHB exists for the work unit ID | 1960 |
| specified in the RLPL. | 1970 |
| If WHB does not exist then | 1980 |
| DO. | 1990 |
| Build a WHB for the work unit. | 2000 |
| Add the WHB to the SIDB—WHB structure. | 2010 |
| END. | 2020 |
| Else. | 2030 |
| Add the RLB built for this lock request to the | 2050 |
| WHB—RLB chain. | 2060 |
| If RHB does not exist then | 2080 |
| DO. | 2090 |
| Build an RHB. | 2100 |
| Add the RHB to the RHT—RHB structure. | 2110 |
| END. | 2120 |
| Else | 2130 |
| DO.  /= RHB already exists    =/ | 2140 |
| Determine if the lock state specified in the | 2150 |
| RLPL is compatible with the state held by each | 2160 |
| RLB on the RHB-hold chain. | 2170 |
| If not compatible with a retained lock RLB then | 2180 |
| DO. | 2190 |
| /=                                       =/ | 2200 |
| /=   LOCK request must be denied because it is   =/ | 2210 |
| /=   incompatible with a lock retained due to    =/ | 2220 |
| /=   failure of an IMS/VS.                       =/ | 2230 |
| /=                                       =/ | 2240 |
| Set LOCK request rejected due to a retained lock | 2250 |
| status in RLPL. | 2260 |
| CALL UNLOCK  /= Release the RLB.  =/ | 2270 |
| Return to caller. | 2280 |
| END. | 2290 |
| Else. | 2300 |
| If not compatible with current holders then | 2310 |
| DO.   /= new request must wait  =/ | 2320 |
| Place the new RLB on the RHB wait chain. | 2330 |
| Exit to the suspend exit of the IMS/VS that | 2340 |
| submitted the request.  /= The request must wait | 2350 |
| until the incompatible current holders UNLOCK | 2360 |
| the resource.  =/ | 2370 |
| END. | 2380 |
| Else. | 2390 |
| END.  /= end of RHB already exists clause  =/ | 2400 |
| If RHT entry mask shows private use of GHT entry | 2410 |
| or RHB already existed and shows no interest by | 2420 |
| the other IRLM then | 2430 |
| DO. | 2440 |
| CALL GRANT.   /= grant the lock request  =/ | 2450 |
| END. | 2460 |
| Else | 2470 |
| DO.  /= Must check GHT and RGHT  =/ | 2480 |
| CALL PTB. | 2490 |
| If PTB returned status = ok to grant then | 2500 |
| CALL GRANT. | 2510 |
| Else | 2520 |
| If PTB returned status = wait then | 2530 |
| Invoke IMS/VS suspend exit to suspend request. | 2540 |
| Else | 2550 |
| DO.'/= Must reject the request  =/ | 2560 |
| Set 'lock can not be granted because the hash | 2570 |
| class specified by the request is unavailable | 2580 |
| due to either an IRLM, System, or Communications | 2590 |
| failure. | 2600 |
| END. | 2610 |
| END.   /= end must check GHT, RGHT case  =/ | 2620 |
| Return to caller. | 2630 |
| | 2640 |
| END LOCK PROCEDURE. | 2650 |

TABLE 5
PTB

| | |
|---|---|
| | 2670 |
| PTB: PROCEDURE. | 2680 |
| | 2690 |
| /=                                                                =/ | 2700 |
| /=                                                                =/ | 2710 |
| /=   This procedure determines whether or not the lock request   =/ | 2720 |
| /=   may be granted immediately, must wait for communications    =/ | 2730 |

TABLE 5-continued

| PTB | | |
|---|---|---|
| /= with the other IRLM, or must be rejected due to an outage | =/ | 2740 |
| /= situation created by an IRLM or communications failure. | =/ | 2750 |
| /= | =/ | 2760 |
| /= This procedure handles the following IRLM sharing modes: | =/ | 2770 |
| /= 1. Normal sharing mode = Both IRLMs are executing and | =/ | 2780 |
| /= have communications with one another. | =/ | 2790 |
| /= 2. IRLM failed mode = The other IRLM is not currently | =/ | 2800 |
| /= executing. This IRLM is implicitly retaining locks | =/ | 2810 |
| /= for the other IRLM. This IRLM cannot grant locks | =/ | 2820 |
| /= for new RHBs that hash into GHT entries that contain | =/ | 2830 |
| /= the other IRLM's interest bit. | =/ | 2840 |
| /= 3. Communications failed mode = Both IRLMs are executing | =/ | 2850 |
| /= but do not have communications with one another. | =/ | 2860 |
| /= An IRLM can only grant locks against GHT entries | =/ | 2870 |
| /= that it had in private use at the time of the | =/ | 2880 |
| /= communications failure. | =/ | 2890 |
| /= | =/ | 2900 |
| /= NOTE - See comments below regarding the RGHT. | =/ | 2910 |
| /= | =/ | 2920 |
| /= _____ | =/ | 2930 |
| | | 2940 |
| If RGHT entry for requested hash value = then | | 2950 |
| DO. | | 2960 |
| /= _____ | =/ | 2970 |
| /= The RGHT entry non-zero means one of the IRLMs | =/ | 2980 |
| /= failed earlier. That failure lost RHBs. The failed | =/ | 2990 |
| /= IRLM restarted, but the IMS/VSs for which it was | =/ | 3000 |
| /= holding locks at the time of the failure have not | =/ | 3010 |
| /= all restarted and purged their locks. Since the | =/ | 3020 |
| /= RHBs are no longer present, no lock can be granted | =/ | 3030 |
| /= for resources that hash into the RGHT entry. | =/ | 3040 |
| /= Once the IMS/VSs have restarted and issued PURGE | =/ | 3050 |
| /= requests to the IRLM or recovery programs run on | =/ | 3060 |
| /= their behalf issue PURGE, the RGHT will be reset | =/ | 3070 |
| /= and normal operations will resume. | =/ | 3080 |
| /= _____ | =/ | 3090 |
| Set must reject request status. | | 3100 |
| Return to caller. | | 3110 |
| END. | | 3120 |
| Else. | | 3130 |
| If IRLM is in normal sharing mode then | | 3140 |
| DO. /= Normal sharing rules =/ | | 3150 |
| If this IRLM's bit is not on in GHT entry then | | 3160 |
| DO. | | 3170 |
| Set this IRLM's bit in the GHT entry. | | 3180 |
| Submit an update GHT request to the other | | 3190 |
| IRLM requesting it to set | | 3200 |
| this IRLM's interest bit in its GHT entry. | | 3210 |
| END. | | 3220 |
| Else. | | 3230 |
| If the interest bit of the other IRLM is off | | 3240 |
| in the requested hask value GHT entry then | | 3250 |
| DO. /= private use of this GHT entry =/ | | 3260 |
| Set RHT mask private bit corresponding to this | | 3270 |
| GHT entry on. | | 3280 |
| Set ok to grant status. | | 3290 |
| END. | | 3300 |
| else | | 3310 |
| DO. | | 3320 |
| Build an inquiry request containing the lock | | 3330 |
| request information. | | 3340 |
| Submit the inquiry request to the other IRLM. | | 3350 |
| Set request must wait status. | | 3360 |
| END. | | 3370 |
| END. /= End normal sharing mode case =/ | | 3380 |
| Else | | 3390 |
| If IRLM failed sharing mode then | | 3400 |
| DO. /= IRLM failed sharing rules =/ | | 3410 |
| If the other IRLM's interest bit is off in GHT entry then | | 3420 |
| DO. | | 3430 |
| Turn on this IRLM's bit in the GHT entry. | | 3440 |
| Set private use bit in corresponding RHT mask. | | 3450 |
| Set ok to grant status. | | 3460 |
| END. | | 3470 |
| Else | | 3480 |
| Set must reject request status. | | 3490 |
| END. /= End IRLM failed sharing rules =/ | | 3500 |
| Else | | 3510 |
| DO. /= Communications failed sharing rules =/ | | 3520 |
| If this IRLM's bit on | | 3530 |

TABLE 5-continued

PTB

| | |
|---|---|
| and other IRLM's bit off in GHT entry then | 3540 |
| DO. | 3550 |
| Set private use bit in corresponding RHT mask. | 3560 |
| Set ok to grant status. | 3570 |
| END. | 3580 |
| Else | 3590 |
| Set must reject request status | 3600 |
| END.    /= End of COMM failed sharing rules case =/ | 3610 |
| | 3620 |
| Return to caller. | 3630 |
| | 3640 |
| END PTB PROCEDURE. | 3650 |

TABLE 6

INQUIRY

| | | |
|---|---|---|
| | | 3670 |
| INQUIRY: PROCEDURE. | | 3680 |
| | | 3690 |
| /= _____ | =/ | 3700 |
| /= | =/ | 3710 |
| /=    This procedure handles global lock inquiry requests | =/ | 3720 |
| /=    submitted from the other IRLM. If the inquiry request is | =/ | 3730 |
| /=    compatible with locks held by this IRLM, a response | =/ | 3740 |
| /=    message is sent back to the requesting IRLM. The message | =/ | 3750 |
| /=    informs that IRLM that it may now grant the lock. It also | =/ | 3760 |
| /=    informs that IRLM whether or not this IRLM is currently | =/ | 3770 |
| /=    holding a lock on the resource. | =/ | 3780 |
| /=    If the inquiry is not compatible, an RLB is built for | =/ | 3790 |
| /=    the inquiry and placed on the RHB wait chain. When | =/ | 3800 |
| /=    the held locks that caused the incompatibility are | =/ | 3810 |
| /=    released, the response message described above is sent | =/ | 3820 |
| /=    back to the inquiring IRLM informing it the lock may now | =/ | 3830 |
| /=    be granted. | =/ | 3840 |
| /= | =/ | 3850 |
| /= _____ | =/ | 3860 |
| | | 3870 |
| Search the RHT—RHB structure to determine if an RHB | | 3880 |
| for the resource specified in the inquiry exists. | | 3890 |
| If RHB does not exist then | | 3900 |
| DO. | | 3910 |
| Build a response message showing it is ok to | | 3920 |
| grant the requested lock and this IRLM has no | | 3930 |
| interest in the resource. | | 3940 |
| Send the message to the inquiring IRLM. | | 3950 |
| END. | | 3960 |
| else | | 3970 |
| DO. | | 3980 |
| If RHB—RLB wait chain is not empty then | | 3990 |
| DO.    /= Inquiry must wait =/ | | 4000 |
| Build an RLB for the inquiry and place | | 4010 |
| it on the RHB—RLB wait chain. | | 4020 |
| END. | | 4030 |
| else | | 4040 |
| DO. | | 4050 |
| Determine if the lock state requested in the | | 4060 |
| inquiry is compatible with the held lock state | | 4070 |
| of each RLB on the RHB hold chain. | | 4080 |
| If the inquiry is compatible then | | 4090 |
| DO. | | 4100 |
| Set the inquiring IRLM's interest bit in | | 4110 |
| RHB IRLM interest mask. | | 4120 |
| Build a response message showing it is ok to | | 4130 |
| grant the requested lock and this IRLM has | | 4140 |
| interest in the resource. | | 4150 |
| Send the message to the inquiring IRLM. | | 4160 |
| END. | | 4170 |
| Else | | 4180 |
| DO. | | 4190 |
| If request incompatible with a retained RLB then | | 4200 |
| DO. _____ | | 4210 |
| /= | =/ | 4220 |
| /=    The requested state is incompatible with | =/ | 4230 |
| /=    the state of a retained lock on the same | =/ | 4240 |
| /=    resource. The lock is retained due to | =/ | 4250 |
| /=    failure of an IMS/VS. Hence, the INQUIRY | =/ | 4260 |
| /=    cannot wait for an UNLOCK. The LOCK | =/ | 4270 |
| /=    request that generated the INQUIRY will | =/ | 4280 |
| /=    be denied with 'reject' status. | =/ | 4290 |

TABLE 6-continued

INQUIRY

| | | | |
|---|---|---|---|
| /= | | =/ | 4300 |
| | Build a response message indicating request | | 4310 |
| | denied due to 'reject' mode lock | | 4320 |
| | Send the message to the IRLM that submitted | | 4330 |
| | the INQUIRY. | | 4340 |
| | End. | | 4350 |
| | Else | | 4360 |
| | DO.  /= Request must wait for UNLOCK(s)  =/ | | 4370 |
| | Build an RLB for the inquiry request. | | 4380 |
| | Place the RLB on the RHB—RLB wait chain. | | 4390 |
| | END. | | 4400 |
| END. | | | 4410 |
| END. | | | 4420 |
| END. | | | 4430 |
| Return to caller. | | | 4440 |
| | | | 4450 |
| END INQUIRY PROCEDURE. | | | 4460 |

TABLE 7

INQRESP

| | | | |
|---|---|---|---|
| INQRESP: PROCEDURE. | | | 4480 |
| /= | | =/ | 4490 |
| /= | | =/ | 4500 |
| /= | This procedure processes the message that is received in | =/ | 4510 |
| /= | response to a global lock INQUIRY request. | =/ | 4520 |
| /= | | =/ | 4530 |
| /= | | =/ | 4540 |
| | | | 4550 |
| If message indicated reject then | | | 4560 |
| DO. | | | 4570 |
| Set reject status in RLPL. | | | 4580 |
| CALL UNLOCK.  /= Release the RLB =/ | | | 4590 |
| END. | | | 4600 |
| Else | | | 4610 |
| DO. | | | 4620 |
| If message indicates interest by other IRLM then | | | 4630 |
| Turn on other IRLM's bit in RHB interest mask. | | | 4640 |
| Else. | | | 4650 |
| CALL GRANT | | | 4660 |
| END. | | | 4670 |
| Return to caller. | | | 4680 |
| END INQRESP PROCEDURE. | | | 4690 |

TABLE 8

UNLOCK

| | | | |
|---|---|---|---|
| UNLOCK: PROCEDURE. | | | 4710 |
| /= | | =/ | 4720 |
| /= | | =/ | 4730 |
| /= | This procedure processes UNLOCK requests submitted | =/ | 4740 |
| /= | by IMS/VS. | =/ | 4750 |
| /= | The UNLOCK request RLPL contains either a lock token | =/ | 4760 |
| /= | (RLB address returned on LOCK) or the hash value, | =/ | 4770 |
| /= | resource name, and work unit id of the lock to be | =/ | 4780 |
| /= | released. | =/ | 4790 |
| /= | | =/ | 4800 |
| /= | | =/ | 4810 |
| | Locate the RLB of the lock to be released. | | 4820 |
| | Remove the RLB from the RHB and WHB chains. | | 4830 |
| | Release the RLB. | | 4840 |
| | If the WHB RLB chain is empty then | | 4850 |
| | Release the WHB. | | 4860 |
| | Else. | | 4870 |
| /= | | =/ | 4880 |
| /= | Attempt to grant locks to waiting requests now that the | =/ | 4890 |
| /= | UNLOCK RLB has been removed from the RHB hold chain. | =/ | 4900 |
| /= | | =/ | 4910 |
| REDRIVE: | | | 4920 |
| DO WHILE RHB wait chain not empty. | | | 4930 |
| Determine if wait RLB does not belong to an IMS/VS that | | | 4940 |
| has issued QUIT and is compatible with each | | | 4945 |
| RLB on the RHB hold chain. | | | 4950 |
| If RLB does not belong to a QUITing IMS/VS and is compatible then | | | 4960 |
| CALL GRANT. | | | 4970 |
| Else | | | 4980 |

TABLE 8-continued

| UNLOCK | |
|---|---|
| Leave REDRIVE loop. | 4990 |
| END. | 5000 |
| If the RHB hold and wait RLB chains are empty then | 5010 |
| DO. | 5020 |
| Remove the RHB from the RHT chain. | 5030 |
| Released the RHB. | 5040 |
| If no other RHB containing the 32-bit hash value of the | 5050 |
| release RHB exists then | 5060 |
| DO. | 5070 |
| Turn off the RHT mask private use bit in the | 5080 |
| entry corresponding to the hash value. | 5090 |
| Turn off this IRLM's interest bit in the GHT | 5100 |
| entry corresponding to the hash value. | 5110 |
| Build an update GHT message and submit it to | 5120 |
| the other IRLM's requesting them to reset this | 5130 |
| IRLM's interest bit in the corresponding entry | 5140 |
| in their GHTs. | 5150 |
| END. | 5160 |
| Else. | 5170 |
| END. | 5180 |
| Else. | 5190 |
| Return to caller. | 5200 |
| END UNLOCK PROCEDURE. | 5210 |

TABLE 9

| GRANT | | |
|---|---|---|
| GRANT: PROCEDURE.  /= Grant a LOCK request  =/ | | 5230 |
| | | 5240 |
| /= | =/ | 5250 |
| /= | =/ | 5260 |
| /=  This procedure grants a lock request. If the request is | =/ | 5270 |
| /=  on the RHB wait chain and is not an inquiry from the other | =/ | 5280 |
| /=  IRLM, it is moved to the RHB hold chain. | =/ | 5290 |
| /=  If the request is an inquiry request, the RLB is | =/ | 5300 |
| /=  removed from the wait chain and released and a message | =/ | 5310 |
| /=  is sent to the inquiring IRLM informing it to grant the | =/ | 5320 |
| /=  lock. | =/ | 5330 |
| /= | =/ | 5340 |
| /= | =/ | 5350 |
| | | 5360 |
| If the RLB to be granted is on the RHB wait chain then | | 5370 |
| DO. | | 5380 |
| Remove the RLB from the wait chain. | | 5390 |
| If the RLB is an inquiry from the other IRLM then | | 5400 |
| Do. | | 5410 |
| Build an inquiry response message. | | 5420 |
| If RHB hold and wait chains are both empty then | | 5430 |
| Set no interest by this IRLM in response message. | | 5440 |
| Else | | 5450 |
| Set interest by this IRLM in response message | | 5460 |
| Send the message to the inquiring IRLM. | | 5470 |
| Return to caller. | | 5480 |
| END. | | 5490 |
| Else. | | 5500 |
| END. | | 5510 |
| Else. | | 5520 |
| Place the RLB on the RHB hold chain. | | 5530 |
| Set lock granted status in RLPL. | | 5540 |
| If request is suspended then | | 5550 |
| invoke IMS/VS resume exit to resume request. | | 5560 |
| else. | | 5570 |
| Return to caller. | | 5580 |
| | | 5590 |
| END GRANT PROCEDURE. | | 5600 |

TABLE 10

| GHTUPD | | |
|---|---|---|
| | | 5620 |
| GHTUPD: PROCEDURE. | | 5630 |
| | | 5640 |
| /= | =/ | 5650 |
| /= | =/ | 5660 |
| /=  This procedure updates this IRLM's GHT based on the content | =/ | 5670 |
| /=  of messages received from other IRLMs. | =/ | 5680 |
| /= | =/ | 5690 |

TABLE 10-continued
GHTUPD

| | |
|---|---|
| /= ──────────────────────────────────── =/ | 5700 |
| | 5710 |
| Locate GHT entry specified in update GHT message. | 5720 |
| If this is a reset bit request then | 5730 |
| DO. | 5740 |
| Turn the specified IRLM's interest bit off in | 5750 |
| the GHT entry. | 5760 |
| If an RHB containing a hash value that maps into | 5770 |
| this GHT entry exists then | 5780 |
| turn on private use bit in corresponding RHT mask. | 5790 |
| Else. | 5800 |
| END. | 5810 |
| Else | 5820 |
| DO. | 5830 |
| Turn the specified IRLM's interest bit on in | 5840 |
| the GHT entry. | 5850 |
| Turn off the private use bit in the RHT mask | 5860 |
| corresponding to this GHT entry. | 5870 |
| END. | 5880 |
| | 5890 |
| END GHTUPD PROCEDURE. | 5900 |

TABLE 11
IDENT

| | |
|---|---|
| INDENT: PROCEDURE. | 5920 |
| | 5930 |
| /= ──────────────────────────────────── =/ | 5940 |
| /= =/ | 5950 |
| /= This procedure processes IMS/VS IDENT requests. THE IDENT =/ | 5960 |
| /= request connects the IMS/VS to the IRLM. An IMS/VS must =/ | 5970 |
| /= issue IDENT before it can issue any other IRLM request. =/ | 5980 |
| /= This procedure builds an SIDB (Subsystem Identify Block) =/ | 5990 |
| /= for the IMS/VS. The ISLs of both IRLMs are updated to =/ | 6000 |
| /= show the IMS/VS is connected to the specific IRLM to =/ | 6010 |
| /= which it issued the IDENT. =/ | 6020 |
| /= At the time of the IDENT, an entry may already exist in =/ | 6030 |
| /= the ISLs for the IMS/VS due to previous activity that =/ | 6040 |
| /= resulted in locks being explicitly (QUIT RETAIN) and/or =/ | 6050 |
| /= implicitly (IRLM/System/Communications failure) retained =/ | 6060 |
| /= for the IMS/VS. =/ | 6070 |
| /= =/ | 6080 |
| /= ──────────────────────────────────── =/ | 6090 |
| | 6100 |
| Build an SIDB for the IMS/VS. | 6110 |
| Search the ISL to determine if an entry exists for this IMS/VS. | 6120 |
| If entry exists then | 6130 |
| Update entry to show the IMS/VS connected to this IRLM. | 6140 |
| Else | 6150 |
| Make an entry to show the IMS/VS connected to this IRLM. | 6160 |
| Send a message to the other IRLM requesting it to update | 6170 |
| its ISL to show the IMS/VS connected to this IRLM. | 6180 |
| Return to caller. | 6190 |
| | 6200 |
| ENTRY IUPDISL: | 6210 |
| | 6220 |
| /= ──────────────────────────────────── =/ | 6230 |
| /= This entry point in the IDENT procedure processes a =/ | 6240 |
| /= message received from the other IRLM that requests update =/ | 6250 |
| /= of the ISL due to an IDENT request. =/ | 6260 |
| /= =/ | 6270 |
| | 6280 |
| Search the ISL to determine if any entry exists for this IMS/VS. | 6290 |
| If entry exists then | 6300 |
| Update entry to show the IMS/VS connected to the other IRLM. | 6310 |
| Else | 6320 |
| Make an entry to show the IMS/VS connected to the other IRLM. | 6330 |
| Return to caller. | 6340 |
| | 6350 |
| END IDENT PROCEDURE. | 6360 |

TABLE 12
QUIT

| | |
|---|---|
| QUIT PROCEDURE. | 6380 |
| | 6390 |

TABLE 12-continued

QUIT

| | | | |
|---|---|---|---|
| /= | | =/ | 6400 |
| /= | | =/ | 6410 |
| /= | This procedure processes a QUIT request. The request may | =/ | 6420 |
| /= | specify either RETAIN or RELEASE. RETAIN means retain | =/ | 6430 |
| /= | all locks currently held by the IMS/VS submitting the | =/ | 6440 |
| /= | request. RELEASE means release (UNLOCK) all locks held | =/ | 6450 |
| /= | or previously retained for this IMS/VS. | =/ | 6460 |
| /= | | =/ | 6470 |
| /= | Held locks are converted to retained locks by removing | =/ | 6480 |
| /= | the associated RLBs from their WHBs and chaining them | =/ | 6490 |
| /= | from a single 'dummy' WHB that is pointed to by the | =/ | 6500 |
| /= | ISL entry of the IMS/VS that holds the locks. | =/ | 6510 |
| /= | | =/ | 6520 |
| /= | Whether locks are retained or released all WHBs and the | =/ | 6530 |
| /= | SIDB associated with IMS/VS are released. | =/ | 6540 |
| /= | | =/ | 6550 |
| /= | | =/ | 6560 |

```
                                                                        6570
If RETAIN specified then                                                6580
DO.                                                                     6590
Build a dummy WHB and connect it to the IMS/VS's                        6600
ISL entry (if such a WHB does not already exist).                       6610
DO While more WHBs exist for the IMS/VS.                                6620
DO While more RLBs exist on the WHB chain.                              6630
If RLB is a wait chain RLB then                                         6640
CALL UNLOCK.   /= Release RLB, redrive waiting requests                 6650
                  of other IMS/VSs (if any) =/                          6655
Else                                                                    6660
Place the RLB on ISL—WHB chain.                                         6670
Move to next RLB on WHB—RLB chain.                                      6680
END.      /= End process WHB—RLB chain =/                               6690
If WHB not already released by UNLOCK then                              6700
Release WHB.                                                            6710
Else.                                                                   6720
Move to next WHB for this IMS/VS.                                       6730
END.                                                                    6740
Update ISL to show locks retained for the IMS/VS.                       6750
END.   /= End RETAIN case =/                                            6760
Else                                                                    6770
DO.  /= RELEASE case  =/                                                6780
DO While more WHBs exist for the IMS/VS.                                6790
DO While more RLBs exist on the WHB chain.                              6800
CALL UNLOCK.    /= Release RLB, redrive waiting requests                6810
                  of other IMS/VSs (if any) =/                          6815
Move to next RLB on WHB—RLB chain.                                      6820
END.                                                                    6830
Move to next WHB for this IMS/VS.                                       6840
END.                                                                    6850
If locks retained dummy WHB exists then                                 6860
DO Until all dummy WHB—RLBs released.                                   6870
CALL UNLOCK.    /= Release RLB, redrive waiting requests                6880
                  of other IMS/VSs (if any) =/                          6885
END.                                                                    6890
Else.                                                                   6900
Delete the ISL entry of the IMS/VS.                                     6910
If locks had been implicitly retained for the IMS/VS then               6920
DO.                                                                     6930
Scan the ISL to determine if this was the last                          6940
IMS/VS for which locks were implicitly retained                         6950
by either or both IRLMs.                                                6960
If last for which locks retained by this IRLM then                      6970
reset this IRLM's bit in each RGHT entry.                               6980
Else.                                                                   6990
If last for which locks retained by other IRLM then                     7000
DO.                                                                     7010
Reset other IRLM's bit in each RGHT entry.                              7020
If not currently communicating with other IRLM then                     7030
Reset other IRLM's bit in each GHT entry.                               7040
Else.                                                                   7050
END.                                                                    7060
Else.                                                                   7070
END.                                                                    7080
Else.                                                                   7090
END.   /= End RETAIN case =/                                            7100
                                                                        7110
Release the SIDB.                                                       7120
Submit a request to the other IRLM requesting update                    7130
of its structures to reflect the QUIT.                                  7140
Return to caller.                                                       7150
                                                                        7160
```

TABLE 12-continued

| QUIT | |
|---|---|
| ENTRY GQUIT. | 7170 |
|  | 7180 |
| /= ——————————————————————————————— =/ | 7190 |
| /=     This entry point processes. QUIT message request     =/ | 7200 |
| /=     submitted by the other IRLM.     =/ | 7210 |
| /= ——————————————————————————————— =/ | 7220 |
|  | 7230 |
| If RETAIN specified then | 7240 |
| DO. | 7250 |
| Update ISL entry to show IMS/VS has issued QUIT | 7260 |
| and locks were retained by the other IRLM. | 7270 |
| END. | 7280 |
| Else | 7290 |
| DO.   /= RELEASE case  =/ | 7300 |
| If locks retained dummy WHB exists then | 7310 |
| DO Until all dummy WHB—RLBs released. | 7320 |
| CALL UNLOCK.    /= Release RLB, redrive waiters =/ | 7330 |
| END. | 7340 |
| Else. | 7350 |
| Delete the ISL entry of the IMS/VS. | 7360 |
| If locks had been implicitly retained for the IMS/VS then | 7370 |
| DO. | 7380 |
| Scan the ISL to determine if this was the last | 7390 |
| IMS/VS for which locks were implicitly retained | 7400 |
| by either or both IRLMs. | 7410 |
| If last for which locks retained by this IRLM then | 7420 |
| reset this IRLM's bit in each RGHT entry. | 7430 |
| Else. | 7440 |
| If last for which locks retained by other IRLM then | 7450 |
| reset other IRLM's bit in each RGHT entry. | 7460 |
| Else. | 7470 |
| END. | 7480 |
| Else. | 7490 |
| END.   /= End RETAIN case =/ | 7500 |
| Return to caller. | 7510 |
|  | 7520 |
| END QUIT PROCEDURE. | 7530 |

TABLE 13

| VERIFY | |
|---|---|
| VERIFY: PROCEDURE. | 7550 |
|  | 7560 |
| /= ——————————————————————————————— =/ | 7570 |
| /= =/ | 7580 |
| /=     This procedure processes an IRLM VERIFY request. VERIFY   =/ | 7590 |
| /=     is submitted by IMS/VS to ensure that the set of other     =/ | 7600 |
| /=     IMS/VSs with which it is sharing access to a particular    =/ | 7610 |
| /=     data base are known to the IRLM. 'Known to the IRLM' means =/ | 7620 |
| /=     an entry for the IMS/VS exists in the IRLM ISL. The        =/ | 7630 |
| /=     existence of the ISL entry ensures any locks held by       =/ | 7640 |
| /=     the IMS/VS are still held or retained.                     =/ | 7650 |
| /= =/ | 7660 |
| /=     Since all IMS/VS assocaited with either IRLM contain       =/ | 7670 |
| /=     ISL entries in both IRLM's ISLs, it is not necessary       =/ | 7680 |
| /=     to communicate with the other IRLM to process the VERIFY.  =/ | 7690 |
| /= =/ | 7700 |
| /= ——————————————————————————————— =/ | 7710 |
|  | 7720 |
| DO Until End of input list. | 7730 |
| Iloop: DO Until End of ISL. | 7740 |
| If input list IMS/VS name matches ISL entry name then | 7750 |
| DO. | 7760 |
| Set 'IMS/VS name known by IRLM' status | 7770 |
| in input list entry. | 7780 |
| Leave Iloop.   /= Move to next input list entry. =/ | 7790 |
| END. | 7800 |
| Else | 7810 |
| Move to next ISL entry. | 7820 |
| END.   /= End ISL scan loop =/ | 7830 |
| Move to next input entry. | 7840 |
| END. | 7850 |
| Return to caller. | 7860 |
| END VERIFY PROCEDURE. | 7870 |

TABLE 14

PURGE

| | | |
|---|---|---|
| PURGE: PROCEDURE. | | 7890 |
| | | 7900 |
| /= | =/ | 7910 |
| /= | =/ | 7920 |
| /=   This procedure processes an IRLM PURGE request. PURGE | =/ | 7930 |
| /=   is issued by an IMS/VS or a recovery program executed | =/ | 7940 |
| /=   on its behalf. The PURGE is issued after correcting the | =/ | 7950 |
| /=   IMS/VS data bases that were left in inconsistent state | =/ | 7960 |
| /=   due to a failure. | =/ | 7970 |
| /= | =/ | 7980 |
| /=   A PURGE request message is sent to the other IRLM. | =/ | 7990 |
| /=   The same logic is performed by the other IRLM. | =/ | 8000 |
| /=   Hence the following pseudocode is the logic for either | =/ | 8010 |
| /=   processing a PURGE request from an IMS/VS or a PURGE | =/ | 8020 |
| /=   request submitted from one IRLM to the other IRLM. | =/ | 8030 |
| /= | =/ | 8040 |
| /= | =/ | 8050 |
| If locks retained dummy WHB exists then | | 8060 |
| DO Until all dummy WHB—RLBs released. | | 8070 |
| CALL UNLOCK.   /= Release RLB, redrive waiters =/ | | 8080 |
| END. | | 8090 |
| Else. | | 8100 |
| Update the ISL entry of the IMS/VS that submitted the | | 8110 |
| PURGE to show that locks are no longer explicitly | | 8120 |
| or implicitly held. | | 8130 |
| If locks had been implicitly retained for the IMS/VS then | | 8140 |
| DO. | | 8150 |
| Scan the ISL to determine if this was the last | | 8160 |
| IMS/VS for which locks were implicitly retained | | 8170 |
| by either or both IRLMs. | | 8180 |
| If last for which locks retained by this IRLM then | | 8190 |
| reset this IRLM's bit in each RGHT entry. | | 8200 |
| Else. | | 8210 |
| If last for which locks retained by other IRLM then | | 8220 |
| DO. | | 8230 |
| Reset other IRLM's bit in each RGHT entry. | | 8240 |
| If not currently communicating with other IRLM then | | 8250 |
| Reset other IRLM's bit in each GHT entry. | | 8260 |
| Else. | | 8270 |
| END. | | 8280 |
| Else. | | 8290 |
| END. | | 8300 |
| Else. | | 8310 |
| Return to caller. | | 8320 |
| END PURGE PROCEDURE. | | 8330 |

TABLE 15

FAIL

| | | |
|---|---|---|
| FAIL: PROCEDURE. | | 8350 |
| | | 8360 |
| /= | =/ | 8370 |
| /= | =/ | 8380 |
| /=   This procedure processes the detection of a failure | =/ | 8390 |
| /=   This causes loss of communication with the other IRLM. | =/ | 8400 |
| /= | =/ | 8410 |
| /= | =/ | 8420 |
| | | 8430 |
| If IRLM or System failure then | | 8440 |
| Set IRLM failed sharing mode. | | 8450 |
| Else | | 8460 |
| Set Communications failed sharing mode. | | 8470 |
| DO While more ISL entries. | | 8480 |
| If ISL entry shows IMS/VS connected to other IRLM then | | 8490 |
| DO. | | 8500 |
| Set other IRLM's bit in ISLFMSK.   /= Locks implicitly | | 8510 |
| retained due to failure =/ | | 8520 |
| END. | | 8530 |
| Else. | | 8540 |
| If ISL entry shows locks explicitly retained by | | 8550 |
| by other IRLM then | | 8560 |
| DO. | | 8570 |
| Set other IRLM's bit in ISLFMSK.   /= Locks implicitly | | 8580 |
| retained due to failure =/ | | 8590 |
| END. | | 8600 |
| Else. | | 8610 |
| Move to next ISL entry. | | 8620 |
| END. | | 8630 |

TABLE 15-continued

| FAIL | |
|---|---|
| Return to caller. | 8640 |
| END FAIL PROCEDURE. | 8650 |
| | 8660 |

TABLE 16

RECONNECT

| | |
|---|---|
| RECONNECT: PROCEDURE. | 8680 |
| | 8690 |
| /= =/ | 8700 |
| /= =/ | 8710 |
| /= This procedure processes the reconnection of one IRLM =/ | 8720 |
| /= with the other IRLM. =/ | 8730 |
| /= =/ | 8740 |
| /= Input to this procedure is: =/ | 8750 |
| /= 1. An indication of whether the other IRLM remembers =/ | 8760 |
| /= a previous connection with this IRLM or not. =/ | 8770 |
| /= 2. A copy of the other IRLM's GHT. =/ | 8780 |
| /= 3. A copy of the other IRLM's RGHT. =/ | 8790 |
| /= 4. A copy of the other IRLM's ISL. =/ | 8800 |
| /= =/ | 8810 |
| /= =/ | 8820 |
| | 8830 |
| If the other IRLM indicates it does not remember a | 8840 |
| previous connection with this IRLM then | 8850 |
| DO Until End of GHT. | 8860 |
| /= =/ | 8870 |
| /= Move any interest bits of the other IRLM from this =/ | 8880 |
| /= IRLM's GHT into the RGHT. Reset the bits in the GHT. =/ | 8890 |
| /= The GHT will reflect locks currently held (RHBs/RLBs =/ | 8900 |
| /= exist) by the other IRLM. The RGHT will reflect =/ | 8910 |
| /= locks implicitly retained due to the IRLM's failure =/ | 8920 |
| /= (no RHBs/RLBs currently exist for these locks). =/ | 8930 |
| /= =/ | 8940 |
| If GHT entry contains other IRLM's interest bit then | 8950 |
| DO. | 8960 |
| Set other IRLM's interest bit in corresponding | 8970 |
| RGHT entry. | 8980 |
| Reset other IRLM's interest bit in GHT entry. | 8990 |
| END. | 9000 |
| Else. | 9010 |
| Move to next GHT entry. | 9020 |
| END. | 9030 |
| Else. | 9040 |
| | 9050 |
| DO Until end of GHT copy received from other IRLM. | 9060 |
| If input GHT entry contains other IRLM's bit then | 9070 |
| Set other IRLM's bit on in this IRLM's GHT entry. | 9080 |
| Else | 9090 |
| Ensure other IRLM's bit is off in this IRLM's GHT entry. | 9100 |
| Move to next entry of input GHT. | 9110 |
| END. | 9120 |
| | 9130 |
| DO Until end of RGHT copy received from other IRLM. | 9140 |
| If input RGHT entry contains other IRLM's bit then | 9150 |
| Set other IRLM's bit on in this IRLM's RGHT entry. | 9160 |
| Else | 9170 |
| Ensure other IRLM's bit is off in this IRLM's RGHT entry. | 9180 |
| Move to next entry of input RGHT. | 9190 |
| END. | 9200 |
| | 9210 |
| Merge the other IRLM's ISL with this IRLM's ISL. | 9220 |
| If the merge reset the locks implicitly retained for | 9230 |
| other IRLM bits in all ISL entries then | 9240 |
| DO. | 9250 |
| Reset the other IRLM's interest bit in each RGHT entry. | 9260 |
| END. | 9270 |
| Else. | 9280 |
| | 9290 |
| If the merge reset the locks implicitly retained for | 9300 |
| this IRLM bits in all ISL entries then | 9310 |
| DO. | 9320 |
| Reset this IRLM's interest bit in each RGHT entry. | 9330 |
| END. | 9340 |
| Else. | 9350 |
| | 9360 |
| If this IRLM has not already sent its status | 9370 |
| to the other IRLM then | 9380 |

TABLE 16-continued
RECONNECT

| | |
|---|---|
| DO. | 9390 |
| Send a copy of this IRLM's GHT, RGHT, ISL, and | 9400 |
| an indication of whether this IRLM remembers a | 9410 |
| previous connection or not to the other IRLM. | 9420 |
| END. | 9430 |
| Else. | 9440 |
| Return to caller. | 9450 |
| END RECONNECT PROCEDURE. | 9460 |

With reference now to the figures and tables, the basic structure and operation of the invention will be described for various typical situations.

Multiple concurrent access to data resources shared by a plurality of work units executing on two central electronic complexes (CEC) is controlled with a minimum of communication and with optimum utilization of space required in each CEC for storage of lock data by providing in each CEC a resource lock manager (IRLM) that includes a global hash table (GHT) that contains an interest bit for each CEC's IRLM in each congruency class and chains of held and wait resource lock blocks (RLB's) associated with resource header blocks (RHB's) and work unit blocks (WHB's). The PHB's are chained and anchored to a Resource Header Table (RHT), which includes for each corresponding entry in the GHT an exclusive use bit. The WHB's are anchored to a subsystem identification block (SIDB). Wait RLB's not anchored to a WHB and which, therefore, relate to requests from the other IRLM, are chained together.

A request for a lock within the above structure will next be described. In this description, data structures shown in FIG. 2 pertaining to IRLM 62 will be indicated by a prime "'". Thus, the GHT of IRLM 61 is GHT 116, and that for IRLM 62 is GHT 116'.

Case I. A request is made, by way of example, for a lock on data resource N1 by IMS 31 on behalf of a work unit by submitting RLPL 110 to IRLM 61. Assuming for this case that the GHT 116, 116' entry = ∅∅ for the corresponding hash class H1 in both IRLM's 61, 62. RLB 154a is created for the request and placed in the wait chain 169 for the data resource N1 (RHB 142). Procedure PTB, Table 5, will set the GHT 116 entry = 1∅ in IRLM 61 for H1 and communicate (Table 5, line 3190) the updated GHT 116 entry via controller 27 to IRLM 62, which will execute procedure GHTUPD (Table 10) to set its GHT 116' entry = 1∅ for H1. IRLM 61 will grant (Table 9) the lock to IMS 31 for N1, set the private use bit on in its RHT 114 for the hash class H1 of the requested data resource (Table 5, line 3260), and move RLB 154a for the request from wait chain 169 to hold chain 157 for RHB 142. In IRLM 62, no entry is made in RHT 114', nor is an RLB created.

Case II. Assuming that the condition created by Case I exists, and a request is made of IRLM 62 by IMS 32. In subcase IIA, the request is for the same data resource (N1) as in Case I. In subcase IIB, the request is for a different data resource N2 of the same hash class H1.

Subcase IIA: IRLM 62 will create an RLB 154a' and place it in the wait queue 169' for RHB 142' of resource N1. It will then change the GHT 116' entry for the hash class H1 from 10 to 11 and communicate to IRLM 61 a GHT update request (GHTUPD Table 10) and an inquiry request (PTB Table 5). IRLM 61 will update its GHT to reflect the interest of IRLM 62 (GHT 116=11). It will also process the inquiry (Table 6). INQUIRY determines, in this subcase IIA, that the request is for a data resource N1 for which a lock has been granted by IRLM 61. Consequently, it accesses hold RLB's 152-154 to determine if this request is compatible (compatible states) with the previously granted lock (or locks). Assuming that the states are compatible, the IRLM interest mask 193 in RHB 142 for the resource in IRLM 61 is set to show IRLM 62's interest and IRLM 62 notified that it can grant the lock. IRLM 62 sets the IRLM interest mask 193' in its RHB 142' for the resource to show IRLM 61's interest, the RLB 154a' is moved from the wait RLB claim 169' to the hold RLB chain 157', and the lock granted to IMS 32.

Assume that this condition prevails, and a request is now made of IRLM 61 for further use of the same data resource N1 with a state which is not compatible with the now prior existing lock on N1 held in IRLM 62. Because IRLM 62's interest bit is on in GHT 116 (GHT 116=11 for H1), IRLM 61 sends a lock request to IRLM 62, specifying the name (N1), hash class (H1), state, and option (assume unconditional). An RLB 163 is created and put in wait chain 169 for RHB 142. In IRLM 62, an RLB 165' is created and added to the wait chain 169 for RHB 142 and, because it is for an incompatible state with, say, the lock corresponding to RLB 154' in the hold chain 157' for RHB 142', RLB 165' is added to the wait RLB chain which is anchored to MCB 112' (rather than to a WHB). No response is communicated from IRLM 62 to IRLM 61 (the request was unconditional), and the lock request is suspended until, in normal processing, the holder of RLB 154' makes an UNLOCK request (Table 8). IRLM 62 will release RLB 154'. Assuming that either there are no other RLB's in hold chain 157' for RHB 142', or that RLB 165' is at the top of wait queue 169' for RHB 142' and of a state compatible with any RLB's still in hold queue 157' for RHB 142', then RLB 165' is released and communication made to IRLM 61 that it can grant the lock requested previously for data resource N1. If RLB 165' were the only wait RLB and there were no hold RLB's for RHB 142', then RHB 142' would also be released. Further, IRLM 62 would reset its interest bit for H1 in GHT 116' (GHT 116' = 10 for H1), and instruct IRLM 61 to set GHT 116 = 10 for H1. Note that no hold RLB has been added to the hold chain for N1 in IRLM 62, but such does exist in IRLM 61 (i.e., RLB 165 is moved from wait chain, as shown, to hold chain, 157, for RHB 142). In this state, IRLM 61 has private use of data resource hash group H1, as GHT 116=GHT 116' = 10 for hash group H1. The corresponding interest bit in RHT 114=1, and in RHT 114'=0.

Subcase IIB: In this example, with the above condition prevailing, a request is made of IRLM 62 by IMS 32 on behalf of work unit of WHB 136' for a lock on a different data resource (N2) which hashes (H1) to the same GHT 116' entry as for a previous request. Initially, GHT 116=GHT 116'=10 (IRLM 61 has an interest and IRLM 62 does not) for hash group H1 of data resources N1, N2. IRLM 62 sets GHT 116′=11 for H1, adds wait RLB 151a′ to the wait chain 168′ for RHB 140′ (the RHB for data resource N2), and of WHB 136′—not as shown in FIG. 2 at this stage—, sends a request to IRLM 61 to update its GHT 116, and a request for a lock on data resource N2 of hash group H1.

IRLM 61 updates GHT 116 (GHT 116=11 for hash group H1), resets the corresponding mask bit in RHT 114 (as IRLM 61 no longer has private use of hash group H1), and searches the RHB chain anchored to the RHT 114 entry corresponding to hash group H1 for an RHB having N2 as its key. Assuming, in this example, that there is no RHB for data resource N2 in IRLM 61, then IRLM 61 responds to IRLM 62 that it is okay to grant the lock. IRLM 61 will not remember the resource locked.

IRLM 62 then moves RLB 151′ from the wait chain 168′ to hold chain 156′ for RHB 140′ and grants the lock. RLB 151′ is now as shown in FIG. 2 in the chain anchored to WHB 136′.

This ends Case II for granting locks.

Best Mode For Carrying Out The Invention

Now, with reference to the figures and pseudocode, the best mode for carrying out the invention for retention of locks across system, communications, and IRLM failures will be described.

Each IRLM 61, 62 maintains an ISL 120, 120′ which will be in synchronization following completion of PTB processing during normal operation.

Assume now that an IMS 33 on CEC 11 terminates. The SIDB, and all WHB's anchored thereto, previously created for IMS 33 are released, as are any wait RLB's anchored to the released WHB's. This leaves the hold RLB's which must be remembered (to prevent other IMS's from obtaining locks to inconsistent data resources held by terminated IMS 33). Consequently, a dummy WHB 130 is created, anchored to the ISL 120 entry for IMS 33, and chained to the hold RLB's 156, 153 previously held by one or more work units executing under IMS 33. In each such RLB 153, 156, a LOCK RETAINED bit is set.

When a subsequent request received for a lock on a data resource for which a prior lock has been granted to a now terminated management system, the lock-held chain is checked for incompatible, retained locks. If such is found, the lock request is rejected; whereas, if an incompatible lock which is not a retained lock is located, the request is waited. Thus, in the example of the preceding paragraph, assume that IMS 34 requests of IRLM 62 a lock on data resource N3 of hash group H2. GHT 116′ will show that IRLM 61 has an interest, so the lock request is sent to IRLM 61. IRLM 61 searches the RHB chain corresponding to hash group H2, and finds therein RHB 114. Assuming that the lock request is for a state which is incompatible with the state of RLB 156, and because the LOCK RETAINED bit is set in RLB 156, IRLM 61 responds with a lock rejected message—which will be communicated by IRLM 62 to IMS 34.

Industrial Applicability

The apparatus and method of the invention is applicable to the operation of general purpose computing systems including a plurality of central electronic complexes which access a shared data base under the control of a locking protocol. The invention provides for the retention of locks across system, subsystem, and communication link failures, thereby preserving the integrity of data and enabling recovery of the data base after restart of the failed component.

Having thus described our invention, what we claim as new and desire to secure by Letters Patent is:

1. A method for operating a general purpose computing system including at least two central electronic complexes interconnected by a communication link and sharing access to at least one data base having a plurality of data resources, the method inhibiting access to data resources that may be inconsistent due to failure in a complex or in the communication link, comprising the steps of:

responsive to failure of a first complex, operating the second complex to inhibit access by the second complex on behalf of a transaction to data resources in which said first complex had an interest prior to the complex failure by terminating said transaction and backing out any changes to said data base made by said transaction;

responsive to failure of the communication link, operating each complex to inhibit access thereby on behalf of a transaction to data resources of a congruence class in which it did not have private use prior to the link failure by terminating said transaction and backing out any changes to said data base made by said transaction; and responsive to failure of a first complex, retaining in the lock control structure of a second complex the congruence classes in which the first complex had an interest prior to the complex failure until completion of restart/recovery processing for all subsystems denoted in the lock control structure of the second complex as identified to the first complex.

2. The method of claim 1 in which at least one of the central electronic complexes includes a plurality of information management subsystems sharing access to said data base, the method further inhibiting access to data resources that may be inconsistent due to failure in a subsystem, comprising the further step of:

responsive to failure of a subsystem, operating each complex to inhibit access by other subsystems to data resources in which the failed subsystem held a lock prior to the subsystem failure.

3. The method of claim 2, comprising the further step of maintaining in each complex a lock control structure, each lock control structure denoting the congruence classes in which each complex has an interest and those for which each complex has private use, and further denoting the complex subsystems identified to both lock control structures.

4. The method of claim 3, further comprising the step of operating each complex to maintain within its lock control structure locks on data resources held by its subsystems.

5. The method of claim 4 further comprising the step responsive to failure of a first subsystem of retaining in its associated lock control structure locks held by said first subsystem until such locks are released by restart or recovery of the first subsystem.

6. The method of claim 3 further comprising the step responsive to failure of the communication link and subsequent recovery of communications of exchanging between complexes the lock control structure data denoting congruence classes of interest or private use, and the data denoting the identified subsystems.

7. A method for controlling access to shared data resources in a multiprocessing, multiprogramming general purpose computing environment to inhibit access to data resources that may be inconsistent due to failures of a communication link, operating system, subsystem, or lock control structure, the method comprising the steps of:

maintaining within each of a plurality of central electronic complexes a lock control structure, the lock control structure including a global hash table containing for each complex an indication of interest in data resources in a plurality of congruence classes, the lock control structure also including a subsystem list identifying each subsystem associated with any lock control structure;

responsive to failure of a first subsystem, retaining within the lock control structure all locks previously granted to said first subsystem until released by restart or recovery of said first subsystem, and enabling access by the other subsystems only to specific data resources not locked by said first subsystem;

responsive to failure of a first operating system on a first complex, retaining in the lock control structure of the other complexes the global hash table entries for the first complex, inhibiting the granting of new locks for data resources in those congruence classes in which the first complex had an interest until the global hash table entries for the first complex have been cleared by restart/recovery of all subsystems associated with the lock control structure of the first complex;

responsive to failure of a communication link interconnecting two complexes, operating each complex to inhibit the granting of locks for any data resource of a congruence class in which the complex did not have a prior interest together with no prior interest by the other complex.

8. A computing system adapted for inhibiting access to shared data resources that may be inconsistent due to a failure, comprising:

first and second central electronic complexes;

communication means for interconnecting said complexes;

data storage means for storing data resources for sharing by said complexes;

each said complex including:
        a plurality of management subsystems for accessing said data resources;
        a lock manager for selectively granting, waiting, and denying locks for data resources to said subsystems;

each said lock manager including:
        global hash table means for denoting for each congruence class the interest state of each complex;
        subsystem list means for denoting each subsystem associated with a lock manager; and
        held lock means for denoting resource locks held by subsystems in the complex of the lock manager; and operating means in each complex for controlling the operation of the computing system for retaining locks for data resources selectively across failures of a complex, of a subsystem, and of the communication means; the operating means being (1) responsive to a failure of a first subsystem for retaining all locks held by said first subsystem until released by restart or recovery thereof, and for granting locks for enabling access by the other subsystems only to data resources not locked by said first subsystem;

(2) responsive to failure of a complex for retaining in the other complex the global hash table entries of the failed complex, and for enabling access by the other complex only to data resources of a congruence class in which the failed complex did not have an interest; and (3) responsive to failure of said communication means for enabling access by each complex to data resources in congruence classes in which the complex had a private use state prior to the communication failure.

* * * * *